Sept. 17, 1929.  R. A. SHIPLEY  1,728,373
APPARATUS FOR MANUFACTURING HOLLOW TILE
Filed Aug. 30, 1927  4 Sheets-Sheet 1
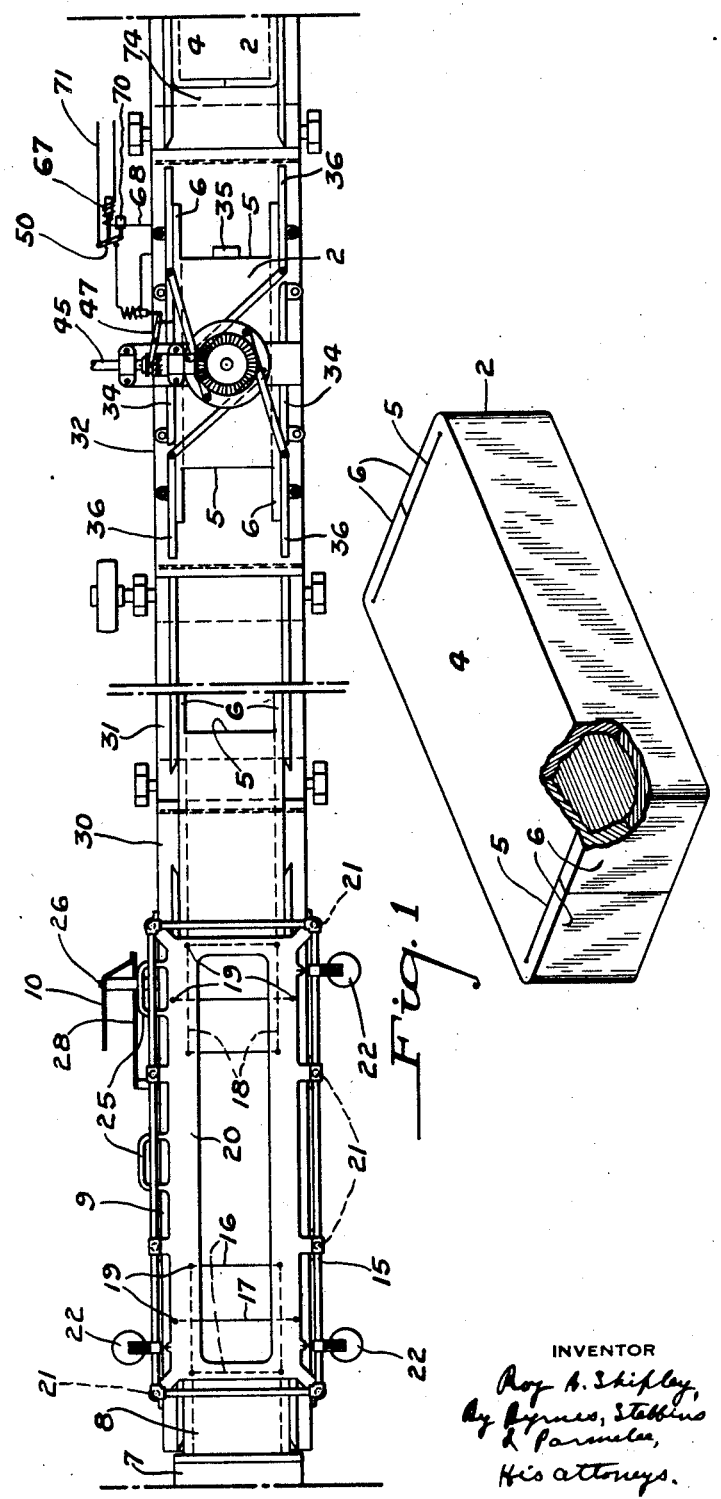
INVENTOR

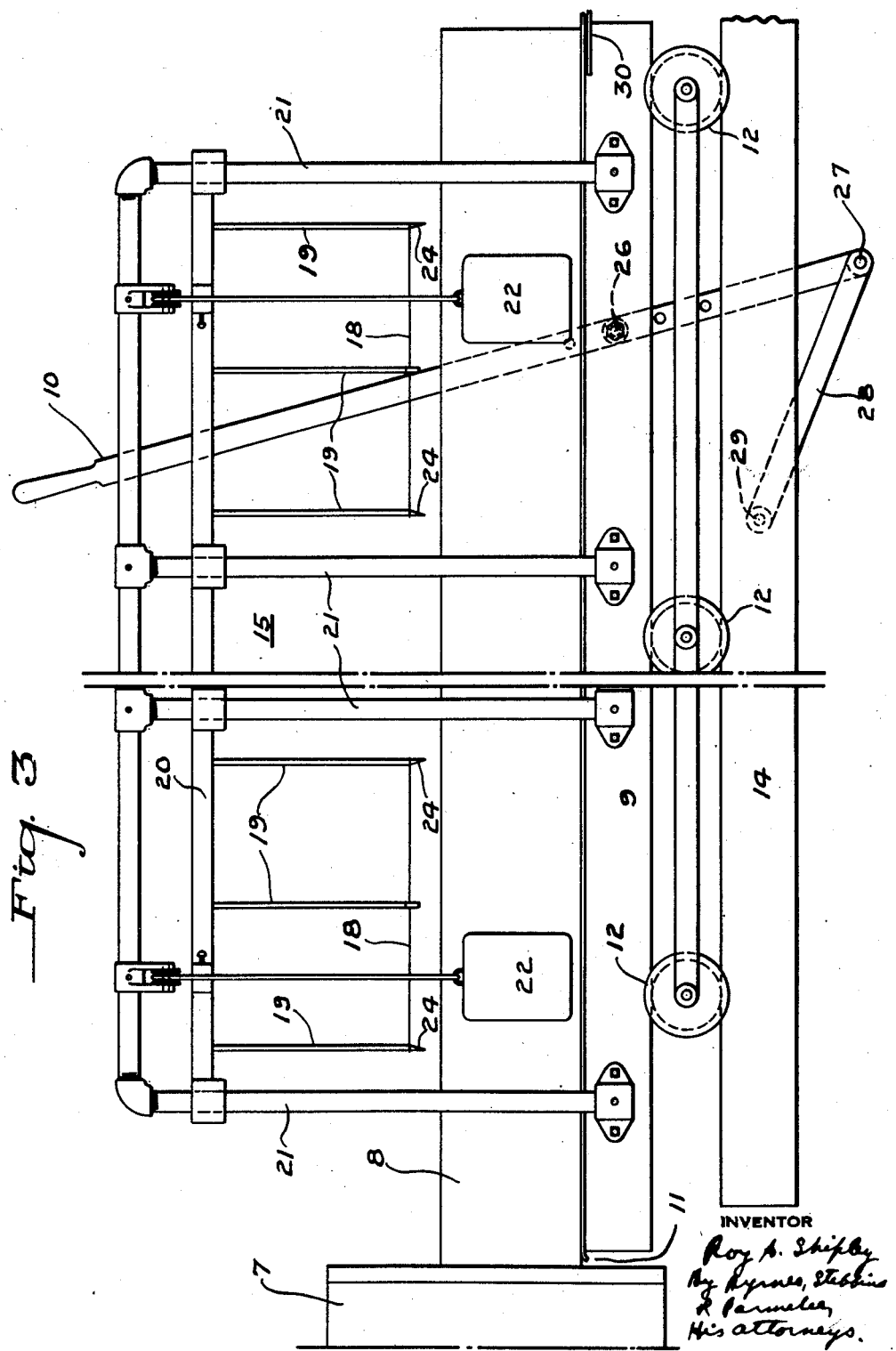

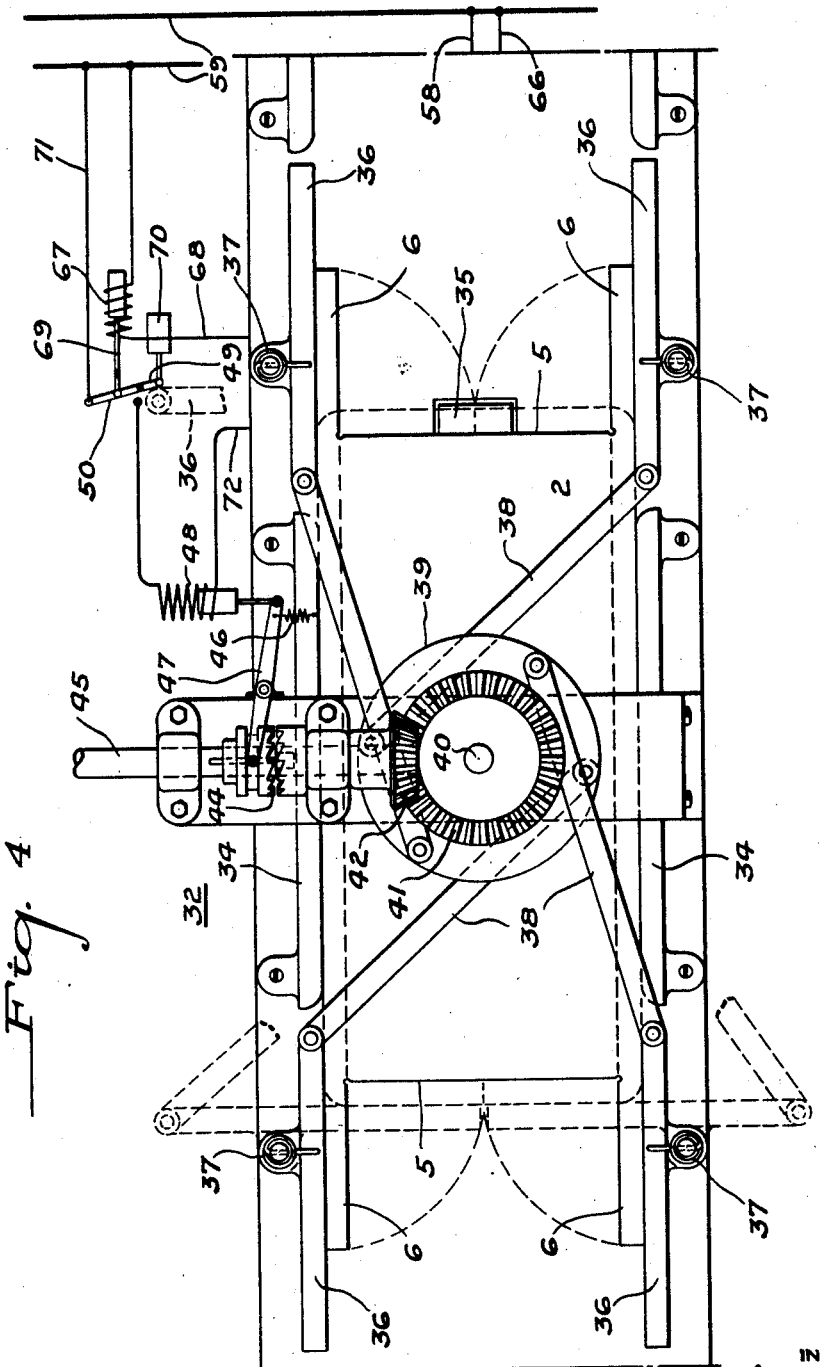

Sept. 17, 1929. R. A. SHIPLEY 1,728,373
APPARATUS FOR MANUFACTURING HOLLOW TILE
Filed Aug. 30, 1927 4 Sheets-Sheet 4

Patented Sept. 17, 1929

1,728,373

UNITED STATES PATENT OFFICE

ROY A. SHIPLEY, OF CANTON, OHIO, ASSIGNOR TO NATIONAL FIRE PROOFING COMPANY, OF PITTSBURGH, PENNSYLVANIA, A CORPORATION OF PENNSYLVANIA

APPARATUS FOR MANUFACTURING HOLLOW TILE

Application filed August 30, 1927. Serial No. 216,372.

My invention relates to apparatus for manufacturing hollow tile and particularly to apparatus for manufacturing a hollow tile having an end formed integrally with the side walls and a method and apparatus for manufacturing the same.

In utilizing the hollow tile for a form over which concrete is poured, considerable loss has heretofore been experienced by reason of the concrete flowing into the open ends of the tile. The concrete within the tile performs no useful purpose and adds considerable dead weight to the structure. In the case of floors this dead weight is particularly undesirable. In certain cases, the waste of concrete, due to its hardening inside the tile, has run as high as 45 per cent.

To eliminate the waste of concrete it has been proposed to close the ends of the tile by a number of methods. One method has been to apply a closure member of different material than the tile to the ends thereof after the tile has been formed. Another method commonly employed is to fill the ends of the tile with paper, or some other light material, during the pouring operation.

In my co-pending application, Serial Number 204,485, filed July 9, 1927, I have shown and described a method and apparatus for closing tile ends during the molding operation for forming the tile bodies.

In my co-pending application, Serial Number 216,373, filed April 30, 1927, I have shown and described a method and apparatus for closing the ends of the tile body by strips of the same material as the tile body, in a continuous forming operation.

In the present application, hollow tiles with closed ends are formed by shaping a tile body in an auger machine, cutting away a portion of the body for forming closure members or flaps and then creating relative movement between the body and closure members or flaps by folding the latter over the ends of the tile body.

In practicing the present invention an off-bearing table is disposed to receive a continuous box-like body of ceramic material extruded from an auger machine. The box-like body of ceramic material is cut into tile sections and a portion of each section is cut away for forming closure members or flaps while on the off-bearing table. From the off-bearing table, the tile sections are transferred to a forming machine provided with means for bending the closure members or flaps over the open ends of the tile. After the closing operation, the finished tile sections are conveyed to other apparatus for subsequent processes, such as a kiln.

The forming machine is automatically controlled by the positioning of the tile sections thereon. A system of stops, switches and electro-magnets is initially actuated by the movement of the tile to a fixed position thereon. After the tile is in position, a clutch is actuated for moving members about their pivotal points to engage and close the closure members or flaps on the tile sections. By providing an electrical system for controlling the forming machine, a greater flexibility in the operation of the machine is obtained than could be obtained with a complete mechanical mechanism. By initiating the operation of the forming machine by the movement of the tile sections inaccuracies in the timing of the various operations performed by the machine, such as are incidental to the manual control of any machine, are eliminated.

The accompanying drawings illustrate the present preferred embodiment of my invention in which:

Figure 1 is a perspective view of a tile formed in accordance with the present invention;

Figure 2 is a plan view of a mechanism for forming the tile shown in Figure 1;

Figure 3 is an elevational view of an off-bearing table constituting a portion of the machine shown in Figure 2;

Figure 4 is a plan view of the forming table, and

Figure 5:
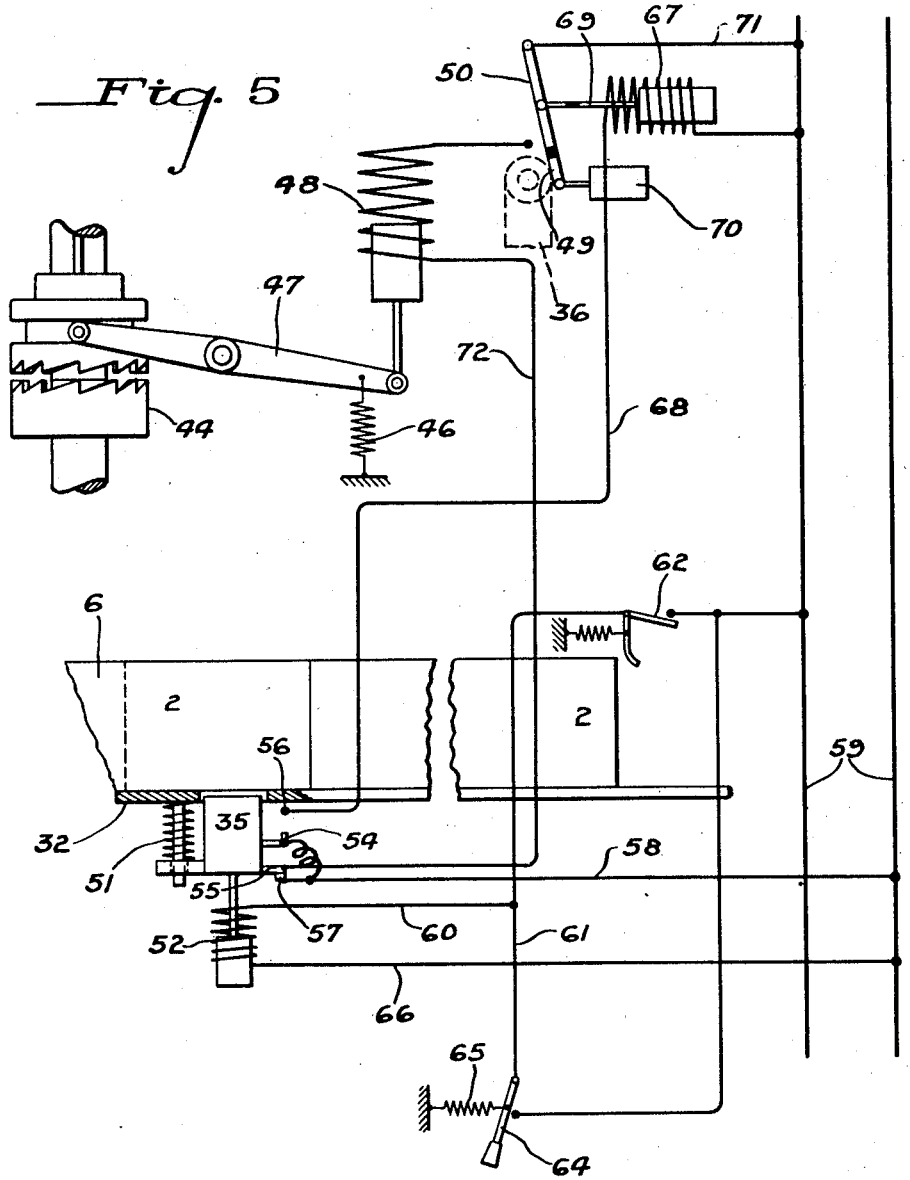
Figure 5 is a diagrammatic view of circuits and apparatus constituting the control system for the forming table.

Referring to Figure 1, a hollow tile 2 is constituted by a body portion 4 having open ends 5. The ends 5 are closed by closure members or flaps 6 formed by cutting away a portion of the body 4 and folding the resultant flap 6 over the ends 5. The number of flaps 6 needed for closing each end 5 may be varied. By cutting away a considerable portion of each body portion 4, each flap or closure member 6 may be made long enough to cover the entire open end 5. For economy of material I have found it desirable to form two flaps at each end of the tile. By utilizing two flaps, the length of the material cut from each end of the body portion 4 is reduced by one-half.

Referring to Figures 2 and 3, an auger machine 7, of well known construction, extrudes a continuous box-like body of ceramic material 8 onto a cutting table 9. The cutting table 9 moves forwardly by reason of its frictional engagement with the ceramic material 8 and is returned into close engagement with the auger machine 7 by the manipulation of a handle 10. The resistance to bending of the ceramic material 8 is sufficient for its self support across the space 11 existing between the auger machine 7 and the cutting table 9. When the cutting table 9 is in its forward position, the space 11 may be over ten inches long. The cutting table 9 is supported by wheels 12 mounted on a track 14. A frame 15 on the table 9 supports a plurality of cutting wires 16, 17 and 18, supported on a plurality of standards 19. The standards 19 are secured to a frame work 20 slidable on upright standards 21 constituting portions of the frame 15. The lower faces of the standards 19 are beveled as at 24 for engaging the material 8 to produce an outward movement for tensioning the cutting wires carried thereon. Counterweights 22 are mounted on the frame 15 for counterbalancing the frame 20. The frame 20 is provided with handles 25 for manually raising and lowering the cutting wires 16, 17 and 18.

The cutting wires 16 are mounted interiorly of the frame 15 and transversely to the longitudinal axis of the ceramic material body 8. The length of the wire 16 is approximately equal to the internal width of the ceramic body 8. The function of the wire 16 is to cut away the opposite top and bottom sides of the body portions 4 without injury to the side walls at right angles to the walls being cut away. The function of the cutting wire 17 is to transversely cut the ceramic body 8 into tile sections. The function of the cutting wires 18 is to cooperate with the wires 16 in cutting away the top and bottom portion of each tile section 2 for forming the flaps or closure members 6. Accordingly the wires 18 are placed so as to be substantially in alinement with the inner edges of the side walls of the ceramic body 8.

The handle 10 is attached to the table 9 by a bolt 26. The lower end of the handle 10 is secured by a pin 27 to a link 28 anchored to the track 14 by a pin 29. Accordingly, as the cutting table 9 moves forwardly, the upper end of the handle 10 moves in a clockwise direction, as viewed in Figure 3. When the handle 10 is moved in a counterclockwise direction, it turns about the pin 27 as a fulcrum to move the table 9 back to its original position. During the reverse movement of the table 9, the ceramic body 8 slides along the face of the table 9 without injury, as the face is made of copper or other metal in a highly polished state.

A plate 30 having telescopic connection with the table 9 is provided for conveying the tile sections 2 from the cutting table 9 onto a conveyor 31. The tile sections 2 are crowded from the cutting table 9 onto the conveyor 31 by the pressure of the oncoming ceramic body 8. The conveyor 31 moves at a considerably higher rate of speed than the rate of extrusion of the ceramic body from the machine, thereby gaining sufficient time for the forming machine 32 to operate upon the tile sections 2 without interrupting the extruding operation of the auger machine 7.

Referring particularly to Figures 2 and 4, the forming machine 32 comprises a pair of guideways 34 that receive the oncoming tile sections 2 and dispose them centrally of the table. A movable stop 35 is provided for limiting the forward movements of the tile sections 2 when pushed onto the machine 32 by the conveyor 31. Adjacent each end of the guides 34 is pivotally mounted a plate 36 for engaging the flaps 6 of each tile section. The plates 36 are biased into alinement with the guides 34 by coil springs 37. The inner end of each plate 36 is connected by a link 38 to a collar 39 carried by a shaft 40 disposed above the tile sections 2 when in position. The shaft 40 is connected by the ring gear 41 and a beveled gear 42, a shaft 43, and a clutch 44 to a driving shaft 45. The clutch 44 is normally biased to an inoperative position by a spring 46 connected to a lever 47. An electro-magnet 48 is provided for moving the clutch 44 into position to drive the shaft 40. A lever 49, for actuating the pilot switch 50, is disposed so as to be engaged by one of the plates 36 for controlling the energization of the electro-magnet 48.

Referring to Figures 4 and 5, the stop 35 is normally biased in a downwardly or inoperative position by a spring 51. An electro-magnet 52 is provided for raising the stop 35 when needed. The stop 35 carries contact members 54 and 55 for cooperating with stationary contact members 56 and 57, respectively. The contact members 54 and 57 are connected by a conductor 58 to a supply circuit 59. One terminal of the electro-magnet 52 is connected by a conductor 60 to a conductor 61 extending between the terminal of a normally open switch 62 and a manually operated switch 64. The switch 62 is positioned to be engaged by a tile section 2 when leaving the forming table 32. Switch 64 is normally held in open position by a spring 65. Switches 62 and 64 are connected to the same conductor of the supply circuit 59.

The other terminal of the electro-magnet 52 is directly connected by a conductor 66 to the supply circuit 59. Accordingly, upon the closure of either switch 62 or 64, the electro-magnet 52 becomes energized to raise the stop 35.

Upon the completion of the upward movement of the stop 35, the circuit between the contacts 54 and 56 is closed for energizing the electro-magnet 67. The circuit extends from the supply circuit 59 through conductor 58, contact members 54 and 56, conductor 68, and the winding of the electro-magnet 67 to the other conductor of the supply circuit 59. The pilot switch 50 is connected to the armature 69 of the electro-magnet 67 for closing the switch. A dashpot 70 is provided for delaying the opening movement of switch 50 under the influence of the plate 36 to prevent premature release of clutch 44. The circuit for the electro-magnet 48 extends from one of the conductors of the supply circuit 59 through a conductor 71, switch 50, electro-magnet 48, conductor 72, contact members 54 and 57 and the conductor 58 to the other conductor of the supply circuit 59. Accordingly, the clutch 44 is actuated only when the stop 35 is in its lowered position thereby preventing the possibility of the plates 36 bending the flaps or closure members 6 into engagement with the stop 35, when in its upper position.

For initiating the operation of the forming table 32, the operator closes the switch 64 thereby energizing the electro-magnet 52 and maintains the switch closed until a tile section 2 engages the stop 35. Thereupon the switch 64 is released and moves to its open position by the contraction of spring 65. The upward movement of the stop 35 completes the circuit for the electro-magnet 67 and the switch 50 is closed. Upon the release of the switch 64 the stop 35 drops to its lowered position by reason of the expansive force of spring 51 and a circuit for the electro-magnet 48 is completed through the switch 50 and contacts 55 and 57. The energization of the electro-magnet 48 causes the clutch 44 to connect the shaft 45 to the gear 42 when the shaft 40 and collar 39 are turned in a clockwise direction to turn the plates 36 against the springs 37. The plates 36 engage the flaps 6 of the tiles and fold them inwardly against the open ends of the body portion 4. At the completion of the folding or bending operation, one of the plates 36 engages the lever 49 on the switch 50 and moves it outwardly against the action of the dash pot 70 to open the circuit of the electro-magnet 48. The de-energizing of the electro-magnet 48 permits a spring 46 to disconnect the clutch 44. The collar 39 and plates 36 are then returned to their initial position by the expansion of the springs 37.

The tile section 2 is then moved forward onto a conveyor 74 by the oncoming tile section. The conveyor section 74 operates at a considerably higher rate of speed than does conveyor section 31. Accordingly, as the tile section is engaged by the conveyor 74, it moves away fast enough to permit the stop 35 to be raised in the path of the oncoming tile section. The departing tile section 2 closes the gravity actuated switch 62 and thereby completes the circuit to the electromagnet 52 for raising the stop 35 against and halting an oncoming tile. Thereafter the forming table 32 operates automatically by the engagement of the departing tile sections 2 with the switch 62. The switch 64 is needed only for controlling the stop 35 during the forming of the first tile section.

It is to be understood that various changes may be made in the invention without departing from the scope of the appended claims.

I claim:

1. In combination, means for shaping an open ended ceramic body and an integral closure member thereon, and mechanical means for disposing the closure member across an open end of the ceramic body.

2. In combination, means for shaping a ceramic body with a portion extending beyond the body portion substantially parallel to a major axis thereof, and pivoted means for bringing the extended portion into substantial parallelism with another axis of the body.

3. The combination with means for forming a continuous box-like ceramic body, of means for sectioning and removing portions of the body for defining closure members and pivoted plates for turning the closure members over the ends of the tile sections.

4. The combination with means for forming a continuous box-like ceramic body, of means for sectioning and removing portions of the body for defining flap members and pivoted means for creating relative movement between the flap members and the body sections.

5. In combination, an auger machine for forming hollow bodies, means for sectioning and forming closure members from the material extruded from the auger machine and means movable through a curved path for engaging the closure members and moving them to a predetermined position.

6. In combination, a die for forming a continuous box-like body of ceramic material, cutters for dividing the ceramic material into sections and for removing portions of each section for forming closure members, and pivoted guides for creating relative movement between the sections and closure members for closing each section.

7. In a cutting machine for ceramic material, means for severing a hollow ceramic body comprising cutting wires extending longitudinally of the ceramic body and adapted to engage opposite inner walls of the ceramic material and cutting wires extending transvesely of the ceramic material in coperative relation to the first mentioned wire whereby sections of oppositely disposed walls of the ceramic material are cut away by cutting wires, and means for moving the cutting wires.

8. In a forming machine, means for severing a hollow body of material having longitudinally extending flaps, means for positioning the material, and means cooperating with the flaps for moving them into engagement with the ends of the material.

9. In a forming machine for ceramic material, means for severing a body of ceramic material having longitudinally projecting closure means, means for moving the closure means into engagement with one end of the severed ceramic material, and means for controlling the last named means in accordance with the position of the ceramic material in the machine.

10. In a forming machine, a guide-way, a pivotally mounted plate disposed adjacent to one end of the guide-way, means for positioning material in the guide-way and means for actuating the plate into substantial parallelism with a face of the material in the guide-way.

11. In a forming machine for ceramic material, means for severing a body of ceramic material having longitudinally projecting closure members, guiding means for the closure members, and means for moving the guiding means through substantially a right angle for moving the closure members into engagement with the body of ceramic material.

In testimony whereof I have hereunto set my hand.

ROY A. SHIPLEY.